R. E. HELLMUND.
PHASE CONVERTER.
APPLICATION FILED APR. 29, 1915.

1,360,293. Patented Nov. 30, 1920.

WITNESSES:
Fred A. Lind.
D. C. Davis.

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

PHASE-CONVERTER.

1,360,293.

Specification of Letters Patent.    Patented Nov. 30, 1920.

Application filed April 29, 1915. Serial No. 24,734.

*To all whom it may concern:*

Be it known that I, RUDOLF E. HELLMUND, a subject of the Emperor of Germany, and a resident of Pittsburgh, in the county of Allegheny and State of Pennsylvania, have invented new and useful Improvements in Phase-Converters, of which the following is a specification.

My invention relates to systems of conversion to be employed with alternating-current circuits, and it has for an object to provide a self-starting phase converter suitable for operation on a single-phase circuit.

Another object of my invention is to provide simple and effective means whereby current may be regenerated from a railway vehicle provided with single-phase motors.

Figure 1:
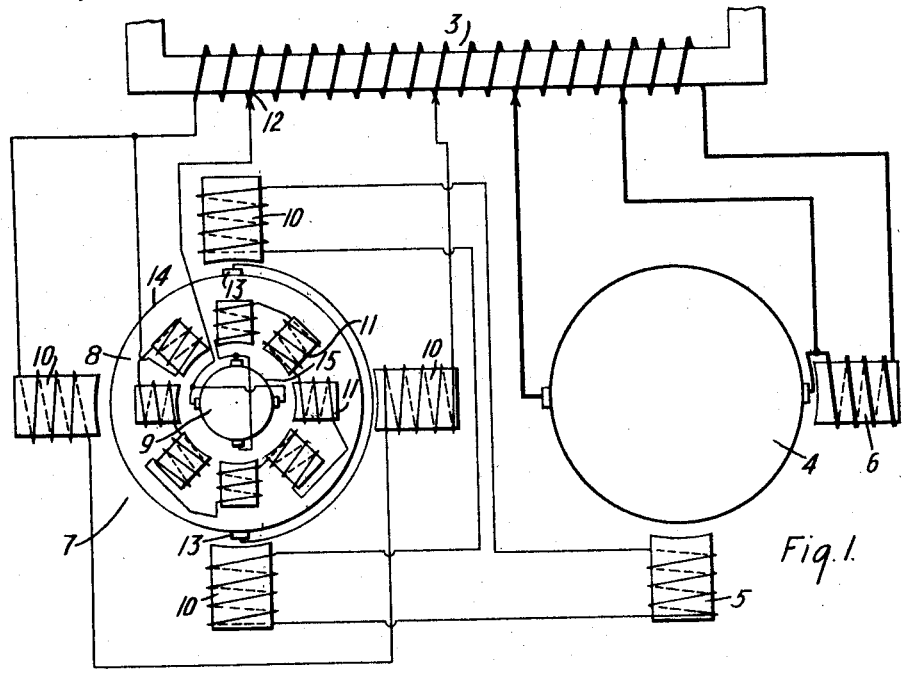
Figure 2:
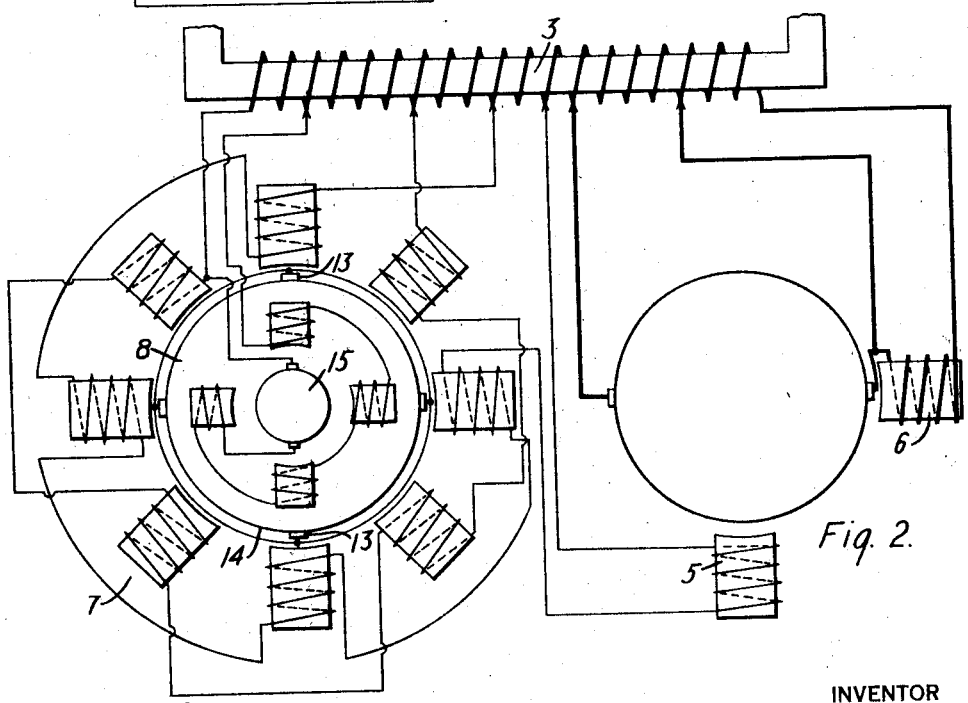

Referring to the accompanying drawing, Figure 1 is a diagrammatic view of the electrical equipment of a railway vehicle constructed in accordance with my invention; and Fig. 2 is a diagrammatic view of a modification of the system shown in Fig. 1.

In the operation of railway vehicles deriving energy from a single-phase alternating-current line and provided with commutating motors, it is frequently desirable to effect regeneration in order that current may be saved on down grades and wear and tear be saved in the braking equipment be eliminated. It is necessary to excite the motors from a source of quadrature voltage during regeneration for reasons fully set forth in U. S. Patent 977,641, granted December 6, 1910, to the Westinghouse Electric & Manufacturing Company, on an application filed by Benjamin G. Lamme. It has hitherto been usual to supply the necessary quadrature exciting voltage by an auxiliary phase-converting machine driven by the car axle or a special motor.

By my invention, I provide a single-phase, phase-converter of the desired type which is self-starting and self-operating and, by combining a phase converter of this type with the railway motors, I am enabled to provide a system which is easily converted from motor operation to regenerative operation.

Referring to Fig. 1 of the accompanying drawings, the secondary winding of a step-down vehicle transformer is shown at 3 and is connected, through suitable adjustable taps, to a propulsion motor 4 of the series commutating doubly-fed type provided with a main field winding 5 and with a cross field winding 6. An auxiliary exciting machine 7 is associated with the motor 6 and comprises an armature 8—9 provided with two windings of the type ordinarily employed in direct-current machines, one of said windings having twice as many poles as the other and with two commutators 14 and 15. A set of field poles 10 is provided to coact with the armature winding 8 associated with the commutator 14, and a similar set of field poles 11—11 is provided to coact with the armature winding 9 associated with the commutator 15. There are twice as many field poles 11 as there are field poles 10 in order that there may be no magnetic interaction between the armature windings. As shown, the field magnet system associated with the armature winding 9 has eight poles 11, those in line with the brushes on the commutator 15 being provided for action as cross field windings and the remainder acting as main field windings. The armature 9 and all the field windings 11—11 are connected in series relation for operation from the portion 12 of the secondary winding 3 as a series commutating motor of the ordinary four-pole type. In like manner, the field-magnet system associated with the armature winding 8 comprises four pole-pieces 10, two of which are adapted to operate as a main field winding and the other two of which are adapted to operate as a cross field winding. The circuit of the armature winding 8 is closed in the axis of the cross field or working winding 10 by a pair of short circuited brushes 13—13 and a suitable interconnection therebetween. The main field windings associated with the armature 8 are connected to be energized from the source 3, and the cross field windings are connected to the main field winding 5 of the machine 4, so that the armature winding 8 operates as a bi-polar generator. Said generator will supply an exciting voltage to the main field winding 5 of proper phase for regenerative purposes.

The pitch of the armature winding operatively associated, for example, with the field poles 10—10 is substantially that of said poles and the resultant effect of the poles 11—11 thereupon is substantially zero as the electromotive forces produced therein by said other system of field poles combine differentially to produce a resultant electromotive force of substantially zero. Said method of operation is substantially that encountered in the ordinary induction motor wherein the speed is controlled by changing the pole number. In like manner, the pitch of the armature winding operatively associated with the field poles 11—11 is substantially that of said poles and the poles 10—10 therefore exert substantially no resultant effect thereupon.

In the form of my invention shown in Fig. 2, the general circuit connections are the same as shown in Fig. 1 except that the motor end of the machine 7 is provided with four poles, whereas the generator end thereof is provided with eight poles. Furthermore, the current supplied by the machine 7 is combined with a voltage derived from the transformer 3 for proper phase correction to supply to the main field winding 5 in the manner described and claimed in my copending application, Serial No. 19,460, filed Apr. 6, 1916, and assigned to the Westinghouse Electric & Manufacturing Company.

While I have illustrated my invention in its preferred forms, it will be obvious to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. A dimorphous dynamo-electric machine embodying a single-phase, alternating-current motor aggregate and a single-phase alternating-current generator aggregate, said machine embodying but a single armature core member and there being such relative polar displacement between said aggregates that the phase of the output electromotive force differs from that of the input electromotive force.

2. A dimorphous dynamo-electric machine embodying a single-phase, alternating-current, commutator motor aggregate and a single-phase, alternating-current, commutator generator aggregate, said machine embodying but a single armature core member and there being such relative polar displacement between said aggregates that the phase of the output electromotive force differs from that of the input electromotive force by a fixed amount.

3. A dimorphous dynamo-electric machine embodying a single-phase, alternating-current motor aggregate and a single-phase, alternating-current generator aggregate, the motor windings being electrically and inductively independent of the generator windings, said machine embodying but a single armature core member and there being such relative polar displacement between said two aggregates that the phase of the output electromotive force differs from that of the input electromotive force.

4. A dimorphous dynamo-electric machine embodying a single-phase, alternating-current, commutator motor aggregate and a single-phase, alternating-current commutator generator aggregate, the motor windings being electrically and inductively independent of the generator windings, said machine embodying but a single armature core member and there being such relative polar displacement between said two aggregates that the phase of the output electromotive force differs from that of the input electromotive force.

5. A polymorphous dynamo-electric machine embodying means for providing a plurality of magnetizing field systems of different pitch, a single armature member mounted in said fields, a plurality of windings mounted on said armature, the pitch of each winding being such that the electromotive forces induced therein by all but one of said field systems substantially neutralize, means for electrically interconnecting points of opposite polarity in one of said windings, and means for inductively deriving energy therefrom.

6. A dimorphous dynamo-electric machine embodying an armature member provided with two windings, means for producing two systems of magnetizing fields of different pitch, each of which is operative upon said armature member, the pitch of one of said windings being such that all electromotive forces produced therein by one of said field systems combine differentially, whereas all electromotive forces produced therein by the other of said field systems combine cumulatively, means for electrically interconnecting points of opposite polarity in said winding, and means capable of inductively deriving energy therefrom.

7. A dimorphous dynamo-electric machine embodying an armature member provided with two windings, means for producing two systems of magnetizing fields of different pitch, each of which is operative upon said armature member, the pitch of one of said windings being such that all electromotive forces produced therein by one of said field systems combine differentially, whereas all electromotive forces produced therein by the other of said field systems combine cumulatively, the pitch of the remaining winding being such that the inverse interaction is produced with said two field systems, means for electrically interconnecting points of opposite polarity in one of said windings, and means capable of inductively deriving energy therefrom.

8. A dimorphous dynamo-electric machine embodying windings for producing a system of $n$ magnetizing poles, windings for producing a system of $m$ magnetizing poles, a single armature member mounted in operative relation to both of said field systems, a winding on said armature having a pitch of substantially $\frac{360°}{n}$, an additional winding on said armature having a pitch of substantially $\frac{360°}{m}$, the relative values of $m$ and $n$ being such that all electromotive forces induced in the $n$ armature winding by the $m$ field system and all electromotive forces induced in the $m$ armature winding by the $n$ field system combine differentially, the axes of the $n$ fields being angularly displaced with respect to the axes of the $m$ fields, and means for permitting energy interchange between each of said windings and an external circuit, whereby if all of said magnetizing field windings are co-phasially excited and alternating current is supplied to one of said armature windings, alternating current of different phase may be derived from the other of said windings.

9. A dimorphous dynamo-electric machine embodying windings for producing a system of $n$ magnetizing poles, windings for producing a system of $m$ magnetizing poles, a single armature member mounted in operative relation to both of said field systems, a winding on said armature having a pitch of substantially $\frac{360°}{n}$, an additional winding on said armature having a pitch of substantially $\frac{360°}{m}$, the relative values of $m$ and $n$ being such that all electromotive forces induced in the $n$ armature winding by the $m$ field system and all electromotive forces induced in the $m$ armature winding by the $n$ field system combine differentially, the axes of the $n$ fields being angularly displaced with respect to the axes of the $m$ fields, means for permitting the conductive interchange of electrical energy between all of said field windings and outside circuits and between one of said armature windings and outside circuits, and means for permitting the inductive interchange of electrical energy between the other rotor winding and outside circuits, whereby if all of said magnetizing field windings are co-phasially excited and alternating current is supplied to one of said armature windings, alternating current of different phase may be derived from the other of said windings.

10. A dimorphous dynamo-electric machine embodying windings for producing a system of $n$ magnetizing poles, windings for producing a system of $m$ magnetizing poles, a single armature member mounted in operative relation to both of said field systems, a winding on said armature having a pitch of substantially $\frac{360°}{n}$, an additional winding on said armature having a pitch of substantially $\frac{360°}{m}$, the relative values of $m$ and $n$ being such that all electromotive forces induced in the $n$ armature winding by the $m$ field system and all electromotive forces induced in the $m$ armature winding by the $n$ field system combine differentially, the axes of the $n$ fields being angularly displaced with respect to the axes of the $m$ fields, means for permitting the conductive interchange of electrical energy between outside circuits and all of said field windings and one of said armature windings, and means for permitting the inductive interchange of electrical energy between outside circuits and the other rotor winding, whereby if all of said field windings are co-phasially excited and alternating current is supplied to said conductively connected armature winding, alternating current of different phase may be derived from said other armature winding.

11. In a dimorphous dynamo-electric machine, the combination with means for producing $n$ magnetizing poles, of means for producing $\frac{n}{2}$ magnetizing poles, one set of said poles being angularly displaced with respect to the other by an angle of $\frac{180°}{n}$ or a multiple thereof, an armature member in operative relation to both of said field systems, a winding on said armature having a pitch of substantially $\frac{360°}{n}$, an additional winding on said armature having a pitch of substantially $\frac{180°}{n}$, and means for interchanging electrical energy between outside circuits and said field producing means and said armature windings, whereby if said field poles are co-phasially excited and alternating current is supplied to one of said armature windings, alternating current of different phase may be derived from said other armature winding.

In testimony whereof, I have hereunto subscribed my name this 23rd day of April, 1915.

RUDOLF E. HELLMUND.